(12) United States Patent
Fair et al.

(10) Patent No.: US 6,302,251 B1
(45) Date of Patent: Oct. 16, 2001

(54) ELECTROMAGNETIC CLUTCH WITH ASYMMETRIC SPOKE PATTERNS

(75) Inventors: Chad E. Fair, Madison Heights; Loren D. Isley, Jr., Clarkston; Lyle Croo, Dearborn Heights, all of MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/517,399

(22) Filed: Mar. 2, 2000

(51) Int. Cl.$^7$ ................................................. B60K 17/344
(52) U.S. Cl. ............................................. 192/35; 192/84.7
(58) Field of Search ......................... 192/35, 84.7, 84.9, 192/84.91, 84.93; 335/279

(56) References Cited

U.S. PATENT DOCUMENTS

| | | |
|---|---|---|
| 1,171,351 | 2/1916 | Neuland . |
| 1,894,979 | 1/1933 | Chubb . |
| 3,329,248 | 7/1967 | Schubert . |
| 3,419,118 | 12/1968 | Allaben, Jr. . |
| 3,789,966 | 2/1974 | Miller . |
| 4,175,650 | 11/1979 | Miller . |
| 4,718,303 | 1/1988 | Fogelberg . |
| 4,828,091 | 5/1989 | Gustin . |
| 5,078,248 | 1/1992 | Yesnik . |
| 5,435,201 | 7/1995 | Preston et al. . |
| 5,492,194 | 2/1996 | McGinn et al. . |
| 5,819,886 | 10/1998 | Organek et al. . |
| 5,915,513 | * 6/1999 | Isley, Jr. et al. ................ 192/35 |
| 6,109,408 | * 8/2000 | Ikeda et al. ..................... 192/35 |
| 6,158,561 | * 12/2000 | Sakai et al. ..................... 192/35 |

* cited by examiner

Primary Examiner—Charles A Marmor
Assistant Examiner—Saúl Rodríguez
(74) Attorney, Agent, or Firm—Brinks, Hofer, Gilson & Lione; Greg Dziegielewski

(57) ABSTRACT

An electromagnetic clutch assembly for transfer cases and other motor vehicle powertrain applications includes a friction disc clutch pack and an electromagnetic operator that applies compressive force to the clutch pack. The electromagnetic operator includes an electromagnetic coil, a rotor partially surrounding the coil, an armature and a ball ramp operator assembly that provides compressive force when the coil is energized. The rotor and armature include aligned paths or tracks of arcuate slots separated by webs or spokes which create a sinuous magnetic flux path and improve performance. The number of slots and thus the number of spokes in the rotor and armature paths are unequal. This inequality greatly reduces pulsations caused by small fluctuations in clutch engagement associated with the repeated, simultaneous alignment and non-alignment of the spokes in a rotor and armature having equal numbers of spokes. This results in improved smoothness of operation and reduces noise and vibration.

20 Claims, 5 Drawing Sheets

ELECTROMAGNETIC CLUTCH WITH ASYMMETRIC SPOKE PATTERNS

BACKGROUND OF THE INVENTION

The invention relates generally to electromagnetic clutches for use in motor vehicle powertrain components and more specifically to an electromagnetic clutch having a rotor and armature with an unequal or asymmetric spoke patterns.

The popularity of sport utility vehicles which typically include selectable four-wheel drive systems and other vehicles such as minivans which offer similar part-time four-wheel drive systems have resulted in extensive development work on such systems and improved sophistication thereof. Whereas several years ago part-time, i.e., operator selectable, four-wheel drive systems were typically only utilized in pickup trucks and other vehicles actually likely to be used off-road and on rough terrain, four-wheel drive systems are now provided in vehicles which are outfitted comparably to near luxury vehicles and include as standard equipment such features as power windows, air conditioning, sunroofs, leather seats and sophisticated audio systems. Accompanying such up-market vehicles is an emphasis on smooth and quiet highway performance where such vehicles are most typically utilized.

Accordingly, extensive effort has been expended by purveyors in this field to provide equipment such as transfer cases which satisfy both the mechanical demands of the particular four-wheel drive system as well as the convenience and performance parameters demanded by purchasers of such vehicles. The present invention is directed to an electromagnetic clutch assembly which provides improved smooth and quiet operation.

SUMMARY OF THE INVENTION

An electromagnetic clutch assembly for transfer cases and other motor vehicle powertrain applications includes a friction disc clutch pack and an electromagnetic operator that applies compressive force to the clutch pack. The electromagnetic operator includes an electromagnetic coil, a rotor partially surrounding the coil, an armature and a ball ramp operator assembly that provides compressive force when the coil is energized. The rotor and armature include aligned paths or tracks of arcuate banana slots separated by webs or spokes which create a sinuous magnetic flux path and improve performance. The number of slots and thus the number of webs or spokes in the rotor and armature paths are unequal. This inequality greatly reduces pulsing associated with the repeated, simultaneous alignment and non-alignment of spokes in rotors and armatures with equal numbers of spokes and results in improved smoothness of operation and reduced noise and vibration.

It is thus an object of the present invention to provide an electromagnetic clutch assembly which provides improved smooth, non-pulsing operation.

It is a further object of the present invention to provide an electromagnetic clutch assembly having a rotor and armature with asymmetric banana slot and spoke patterns.

It is a still further object of the present invention to provide an electromagnetic clutch assembly wherein a sinuous flux path and a rotor and armature are created by banana slots with unequal or asymmetric spoke or web patterns.

It is a still further object of the present invention to provide an electromagnetic clutch assembly wherein a rotor and armature have banana slots and a spoke pattern wherein only a single pair of spokes in the rotor and armature are in alignment at one time.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
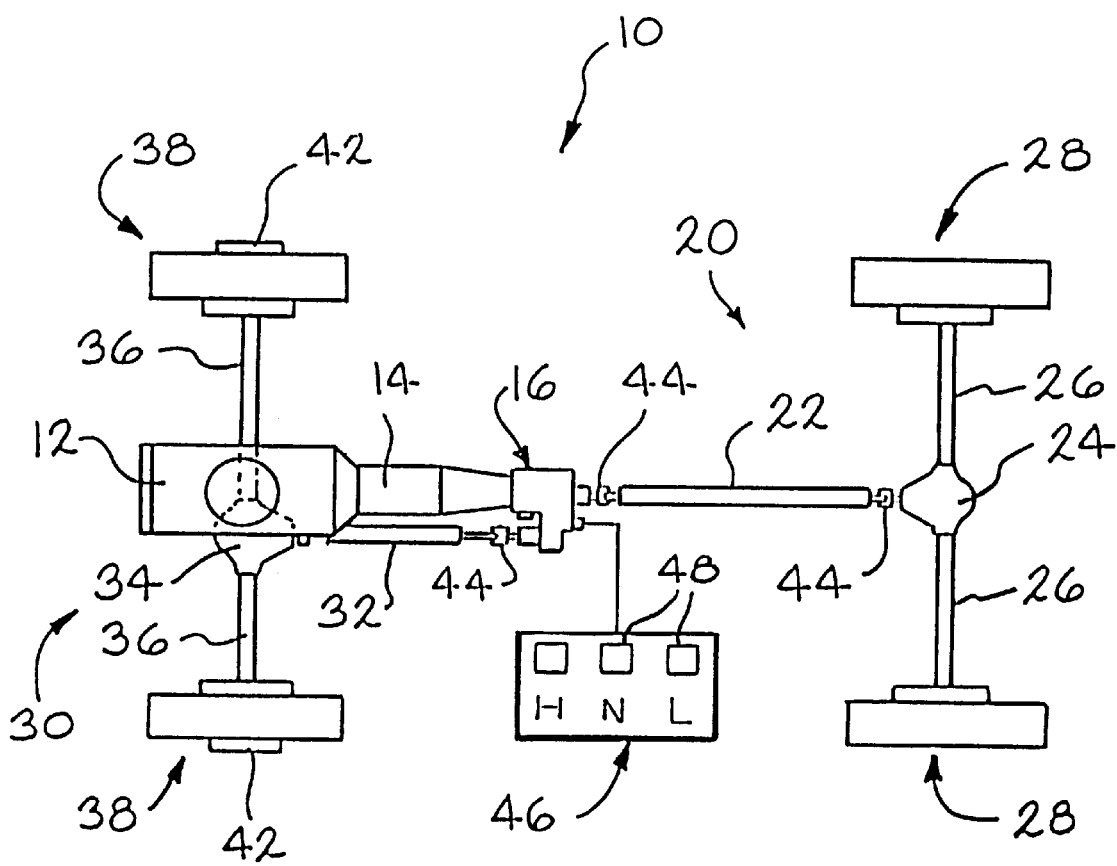
FIG. 1 is a diagrammatic, plan view of a four-wheel drive motor vehicle powertrain having a transfer case which incorporates the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the front axles 36 or, if desired, a pair of manually or remotely activatable locking hubs 42 may be operably disposed between the front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components.

Mounted within the passenger cabin in a location proximate the driver of the motor vehicle is a control assembly 50 having a plurality of push buttons 52 which correspond to the various driver selectable operating modes of the transfer case assembly 16 such as high, neutral and low. Alternatively, the push buttons 52 may be replaced by a rotary switch or other analogous driver selectable input device. The control assembly 50 may include various electronic computation, logic and output devices as well as devices which receive signals and provide logic decisions based upon feedback or signals provided by components of the transfer case assembly 16.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary drive line 20 is disposed at the front of the vehicle and the secondary drive line 30 is disposed at the rear of the vehicle, such designations primary and secondary thus broadly and properly characterizing the function of the individual drive lines rather than their specific locations.

Figure 2:
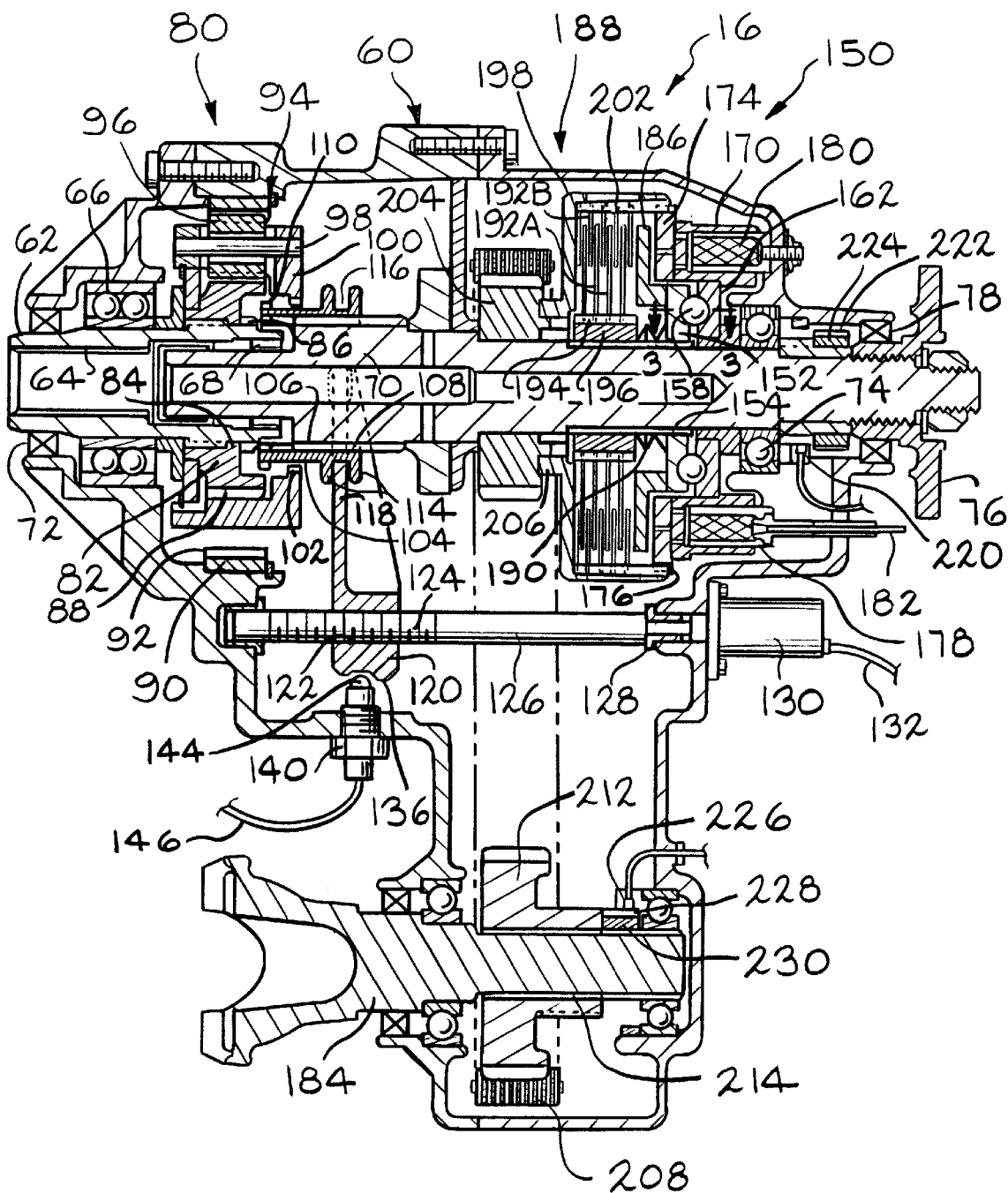
FIG. 2 is a full, sectional view of a transfer case having an electromagnetic clutch assembly incorporating the present invention.

Referring now to FIGS. 1 and 2, the transfer case assembly 16 incorporating to the present invention includes a multiple piece housing assembly 60 having a plurality of planar sealing surfaces, openings for shafts and bearings and various recesses, shoulders, counterbores and the like to receive various components or assemblies of the transfer case assembly 16. An input shaft 62 includes female or internal splines or gear teeth 64 or other suitable coupling structures which drivingly couple the output of the transmission 14 illustrated in FIG. 1 to the input shaft 62. The input shaft 62 is rotatably supported at one end by an anti-friction bearing such as the ball bearing assembly 66 and at its opposite end by an internal anti-friction bearing such as the roller bearing assembly 68. The roller bearing assembly 68 is disposed upon a portion of a stepped output shaft 70. A suitable oil seal 72, positioned between the input shaft 62 and the housing assembly 60, provides an appropriate fluid tight seal therebetween. The opposite end of the output shaft 70 is supported by an antifriction bearing such as the ball bearing assembly 74 and include a flange 76 which may be a portion of a universal joint 44 or may be secured to associated drive line components such as the primary prop shaft 22. A suitable oil seal 78, disposed between the flange 76 and the housing assembly 60 provides an appropriate fluid tight seal therebetween.

Figure 3:
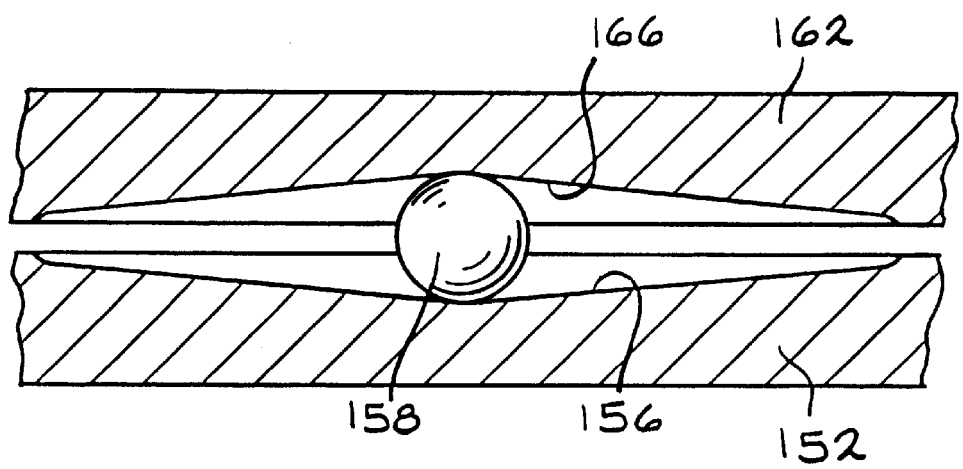
FIG. 3 is a flat pattern development of a portion of the ball ramp operator taken along line 3—3 of FIG. 2.

Referring now to FIGS. 2 and 3, the transfer case assembly 16 includes a two-speed planetary gear drive assembly 80 disposed about the input shaft 62. The planetary gear drive assembly 80 includes a sun gear 82 having a plurality of female or internal splines or gear teeth 84 which engage a complementary plurality of male splines or gear teeth 86 on the input shaft 62. The sun gear 82 is thus coupled to the input shaft 62 and rotates therewith. The sun gear 82 includes external or male gear teeth 88 about its periphery. Radially aligned with the sun gear 82 and its teeth 84 is a ring gear 90 having inwardly directed gear teeth 92. The ring gear 90 is retained within the housing assembly 60 by a cooperating circumferential groove and snap ring assembly 94. A plurality of pinion gears 96 are rotatably received upon a like plurality of stub shafts 98 which are mounted within and secured to a planet carrier 100. The planet carrier 100 includes a plurality of female or internal splines or gear teeth 102 disposed generally adjacent the male splines or gear teeth 86 on the input shaft 62. The planetary gear assembly 80 is more fully described in co-owned U.S. Pat. No. 4,440,042 which is herein incorporated by reference.

The planetary gear drive assembly 80 also include a dog clutch or clutch collar 104 defining female or internal splines or gear teeth 106 which are axially aligned with and, in all respects, complementary to the male splines or gear teeth 86 on the input shaft 62. The clutch collar 104 and its internal splines or gear teeth 106 are slidably received upon a complementary plurality of male or external splines or gear teeth 108 on the stepped output shaft 70. The clutch collar 104 thus rotates with the output shaft 70 but may translate bidirectionally along it. The clutch collar 104 also includes male or external splines or gear teeth 110 on one end which are in all respects complementary to the female splines or gear teeth 102 on the planet carrier 100.

Finally, the dog clutch or clutch collar 104 includes a pair of radially extending, spaced-apart flanges 114 on its end opposite the splines or gear teeth 110 which define a circumferential channel 116. The channel 116 receives a complementarily configured semi-circular throat or yoke 118 of a shift fork 120. The shift fork 120 includes a through passageway defining female or internal threads 122 which engage complementarily configured male or external threads 124 on a rotatable shift rail 126. The shift rail 126 is received within suitable journal bearings or bushings 128 and is coupled to and driven by a rotary electric, pneumatic or hydraulic motor 130. The rotary motor 130 is provided with energy through a line 132.

The end of the shift fork 120 opposite the semi-circular yoke 118 includes a cam 136 having a recess and a first, taller or longer lug or projection and a second, shorter lug or projection having a height greater than, or at least distinct from, the recess. A three position sensor 140 having a roller or ball actuator 144 includes proximity or position sensors such as Hall effect sensors which provide outputs in a preferably multiple conductor cable 146 defining a first signal indicating that the shift fork 120 and associated clutch collar 104 is in the neutral position illustrated in FIG. 2 that the shift fork 120 has moved to the left from the position illustrated such that the actuator 144 engages and is translated by the taller lug or projection of the cam 136 and the sensor 140 provides a signal indicating that the clutch collar 104 is in a position which selects high gear or direct drive, effectively bypassing the planetary gear assembly 80, or, conversely, that the shift fork 120 has moved to the right from the position illustrated in FIG. 2 such that the second, shorter lug or projection of the cam 136 has engaged and translated the actuator 144 so that the sensor 140 indicates that the shift fork 120 has translated to select the low speed output or speed range of the planetary drive assembly 80. Such translation is achieved by selective bidirectional operation of the drive motor 130 which rotates the shift rail 126 and bidirectionally translates the shift fork 120 along the male threads 124 of the shift rail 126.

The transfer case assembly 16 also includes an electromagnetically actuated disc pack type clutch assembly 150. The clutch assembly 150 is disposed about the stepped output shaft 70 and includes a circular drive member 152 coupled to the output shaft 70 through a splined interconnection 154. The circular drive member 152 includes a plurality of circumferentially spaced apart recesses 156 in the shape of an oblique section of a helical torus. Each of the recesses 156 receives one of a like plurality of load transferring balls 158.

A circular driven member 162 is disposed adjacent the circular drive member 152 and includes a like plurality of opposed recesses 156 defining the same shape as the recesses 156 in the circular drive member 152. The oblique side walls of the recesses 156 and 166 function as ramps or cams and cooperate with the balls 158 to drive the circular members 152 and 162 apart in response to relative rotation therebetween. It will be appreciated that the recesses 156 and 166 and the load transferring balls 158 may be replaced with other analogous mechanical elements which cause axial displacement of the circular members 152 and 162 in response to relative rotation therebetween. For example, tapered rollers disposed in complementarily configured conical helices may be utilized.

The circular driven member 162 extends radially outwardly and is secured to a soft iron rotor 170. The rotor 170 is disposed in opposed relationship with an armature 174. The armature 174 includes a plurality of gear teeth or splines 176 on its periphery. The rotor 170 is U-shaped and partially surrounds a housing 178 containing an electromagnetic coil 180. A single or two conductor cable 182 provides electrical energy to the electromagnetic coil 180, Providing electrical energy to the electromagnetic coil 180 through the cable 182 causes magnetic attraction of the armature 174 to the rotor 170. This magnetic attraction results in frictional contact of the armature 174 with the rotor 170. When the output shaft 70 is turning at a different speed than the armature 174 which turns at the same rotational speed as a secondary output shaft 184, this frictional contact results in drag torque being transferred from the output shaft 70, through the circular drive member 152, through the load transferring balls 158 and to the circular driven member 162. The resulting drag torque causes the balls 158 to ride up the ramps of the recesses 156 and 166 and axially displaces the circular drive member 152. Axial displacement of the circular drive member 152 translates an apply plate 186 axially toward a disc pack clutch assembly 188. A compression spring 190 provides a restoring force which biases the circular drive member 152 toward the circular driven member 162 and returns the load transferring balls 158 to center positions in the circular recesses 156 and 166 to provide maximum clearance and minimum friction between the components of the electromagnetic clutch assembly 150 when it is energized.

An important design consideration of the recesses 156 and 166 and the balls 158 is that the geometry of their design, the design of the compression spring 190 and the clearances in the clutch assembly 150 ensure that it is not self-engaging. The electromagnetic clutch assembly 150 must not self-engage but rather must be capable of modulated operation and torque transfer in direct response to a modulating input signal.

The disc pack clutch assembly 188 includes a plurality of interleaved friction plates or discs 192A and 192B. A first plurality of discs 192A are coupled by interengaging splines 194 to a clutch hub 196 which is, in turn, coupled to the stepped output shaft 70 for rotation therewith. A second plurality of discs 192B are coupled to an annular housing 198 by interengaging splines 202 for rotation therewith. The splines or gear teeth 176 on the armature 174 also engage the splines 202 on the annular housing 198.

The annular housing 198 is disposed for free rotation about the output shaft 70 and is rotationally coupled to a chain drive sprocket 204 by a plurality of interengaging lugs and recesses 206. The drive sprocket 204 is also freely rotatably disposed on the stepped output shaft 70. A drive chain 208 is received upon the teeth of the chain drive sprocket 204 and engages and transfers rotational energy to a driven chain sprocket 212. The driven chain sprocket 212 is coupled to the secondary output shaft 184 of the transfer case assembly 16 by interengaging splines 214.

The transfer case assembly 16 also includes a first Hall effect sensor 220 which is disposed in proximate, sensing relationship with a plurality of teeth 222 on a tone wheel 224. The tone wheel 224 is coupled to and rotates with the stepped output shaft 70. A second Hall effect sensor 226 is disposed in proximate, sensing relationship with a plurality of teeth 228 of a tone wheel 230 disposed on the driven chain sprocket 212. Preferably, the number of teeth 222 on the tone wheel 224 is identical to the number of teeth 228 on the tone wheel 230 of the driven sprocket 212 so that identical shaft speeds result in the same number of pulses per unit time from the Hall effect sensors 220 and 226. This simplifies computations and improves the accuracy of all decisions based on such data. As to the actual number of teeth 222 on the tone wheel 224 and teeth 228 on the tone wheel 230, it may vary from thirty to forty teeth or more or fewer depending upon rotational speeds and sensor construction. The use of thirty-five teeth on the tone wheels has provided good results with the Hall effect sensors 220 and 226.

Figure 4:
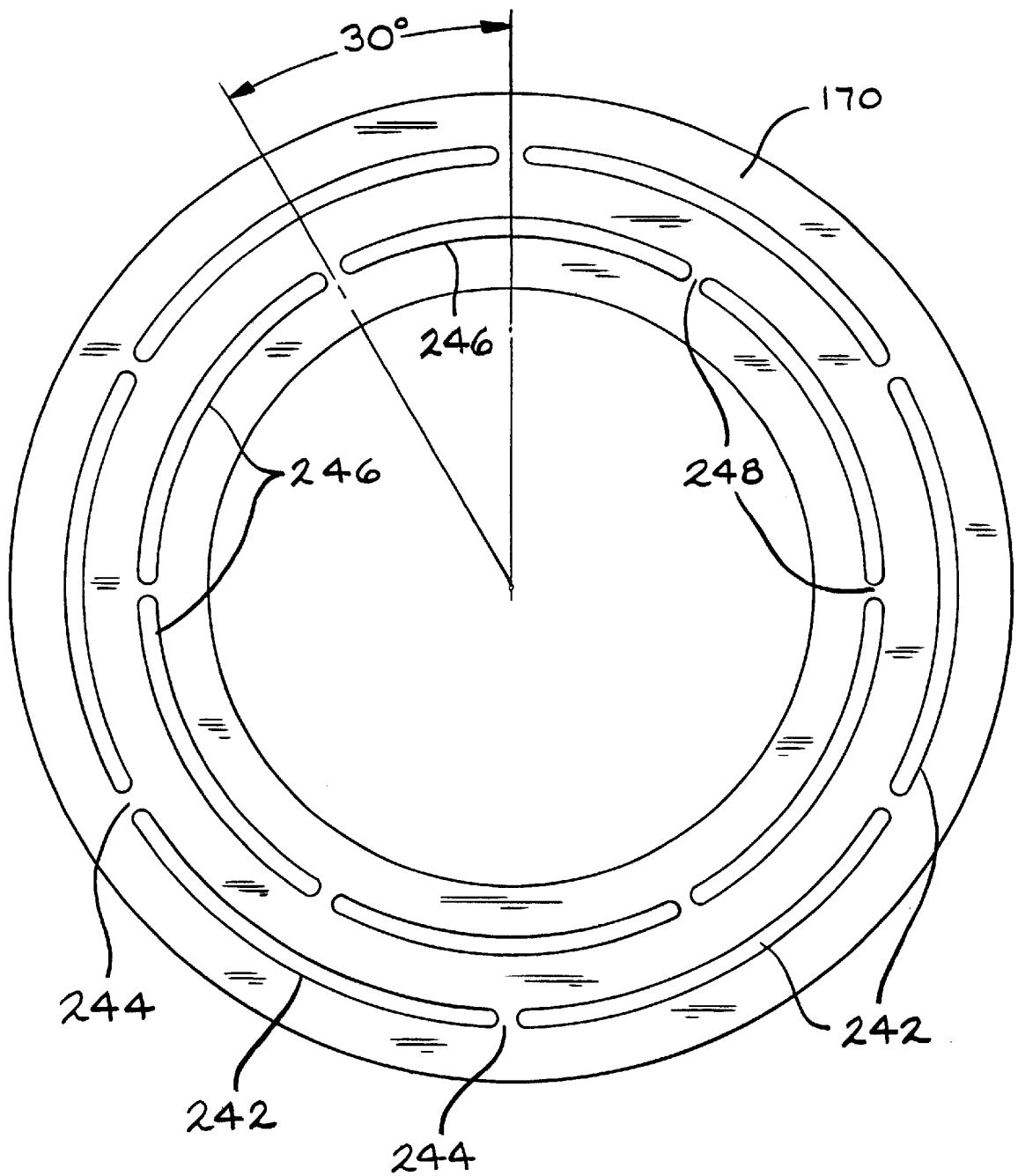
FIG. 4 is a front, elevational view of a rotor of an electromagnetic clutch assembly according to the present invention.

Referring now to FIG. 4, the rotor 170 of the electromagnetic disc pack type clutch assembly 150 includes a first, outer plurality or circle of through, arcuate banana slots 242 which are separated by webs or spokes 244 and a second, inner plurality or circle of through, arcuate banana slots 246 which are separated by webs or spokes 248. As used herein, the term "banana slots" refers to a plurality of curved or arcuate slots which are arranged end-to-end to form a discontinuous circular path of open or through slots which resemble bananas. Preferably, the inner and outer pluralities of banana slots 242 and 246 include equal numbers of slots. Six of the outer banana slots 242 and six of the inner banana slots 246 have been found suitable. When six of the banana slots 242 and 246 are utilized, one of the pluralities of banana slots 242 or 246, for example, the inner plurality of banana slots 246, is circumferentially offset 30° from the outer plurality of banana slots 242. In this way, the spokes or webs 244 and 248 are staggered or offset from one another. If the number of banana slots 242 and 246 is reduced to four, the webs or spokes 244 and 248 are then circumferentially offset between the inner and outer pluralities of banana slots 242 and 246 by 45°. Correspondingly, if the number of banana slots 242 and 246 is increased to eight, the webs or spokes 244 and 248 are preferably offset by 22.5°. It will be appreciated that other numbers of banana slots 242 and 246 and corresponding numbers of spokes or webs 244 and 248 will preferably be circumferentially offset correspondingly.

Figure 5:
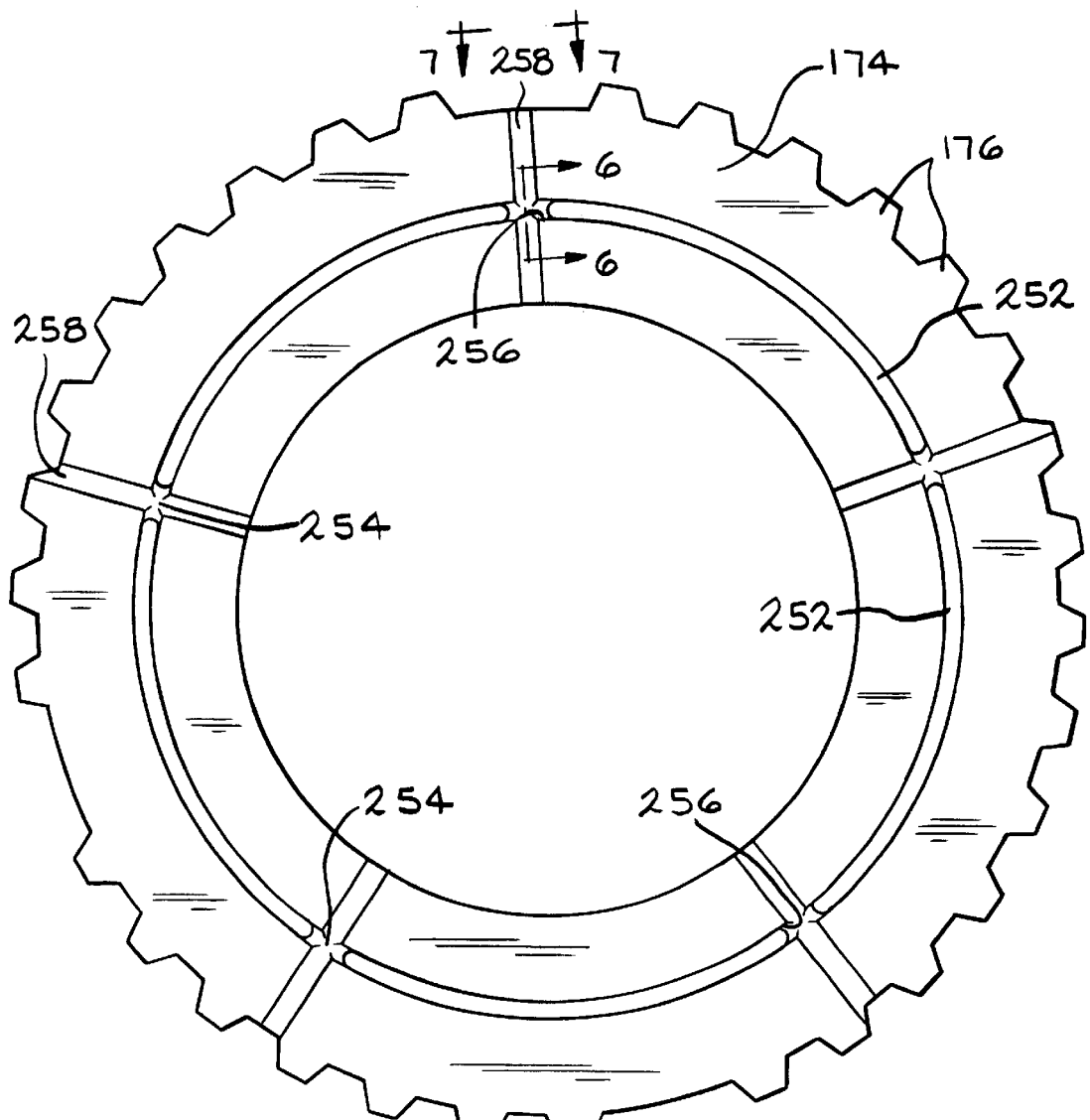
FIG. 5 is a front, elevational view of an armature of an electromagnetic clutch according to the present invention.
Figure 6:
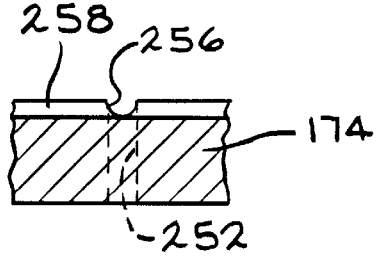
FIG. 6 is a fragmentary, sectional view of an armature of an electromagnetic clutch according to the present invention taken along line 6—6 of FIG. 5.
Figure 7:
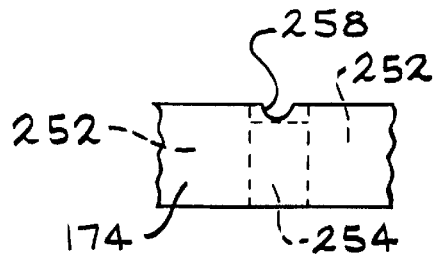
FIG. 7 is a fragmentary, sectional view of an armature of an electromagnetic clutch according to the present invention taken along line 7—7 of FIG. 5.

Turning now to FIGS. 5, 6 and 7, the armature 174 is illustrated and includes a single path or circle of banana slots 252 having webs or spokes 254. Cooperation between the banana slots 242, 246 and 252 provides a sinuous magnetic flux path, thereby increasing the attraction between the rotor 170 and the armature 174 for a given magnetic flux level and increasing clutch engagement and torque throughput for a given current flow, thereby reducing current consumption and energy dissipation in the electromagnetic coil 180. Preferably, there are five banana slots 252 and five webs or spokes 254 although this number may be adjusted up or down in conjunction with the number of banana slots 242 and 246 in the rotor 170. In accordance with the present invention, the number of banana slots 252 is not equal to the number of banana slots 242 or 246 in the rotor 170 but is preferably a number one integer larger or smaller than the number of banana slots 242 and 246 in each circle or path of the rotor 170. That is, where N equals the number of banana slots 242 in the outer circle as well as the number of banana slots 246 in the inner circle, N±1 represents a suitable number of banana slots 252 in the armature 174 although other combinations of unequal numbers of slots 242, 246 and 252 may be utilized. Alternatively, the number 1 in the expression may be replaced by an odd integer such as 3 or 5.

Figure 8:
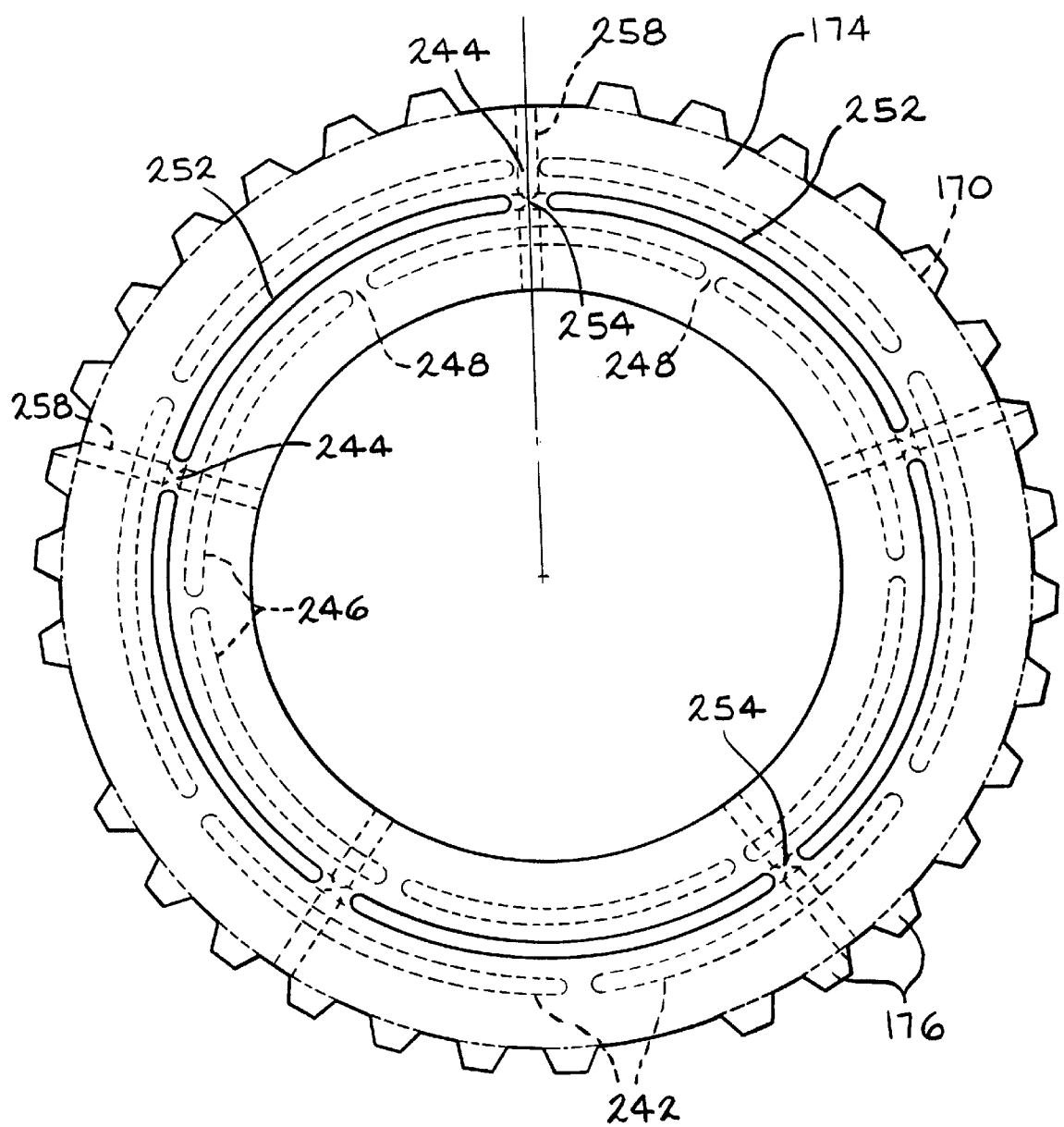
FIG. 8 is a rear, elevational view of an armature and rotor of an electromagnetic clutch according to the present invention.

As illustrated in FIG. 8, the radial location of the banana slots 252 in the armature 174 is preferably equally spaced between the two circles or paths of the banana slots 242 and 246 in the rotor 170. As illustrated in FIG. 6, extending across each of the spokes 254, and aligned with the banana slots 252, is a semicircular recess or channel 256. Aligned with each of the webs or spokes 254 is a radially extending recess or channel 258 which is illustrated in FIG. 7. Thus, at each of the webs or spokes 254, the armature 174 is cut away such that the face or surface of the web or spoke 254 aligned with the banana slots 252 is recessed or spaced from the face of the armature 174 and the adjacent face of the rotor 170.

Turning now to FIG. 8, the utilization of a first plurality of staggered banana slots 242 and 246 and webs or spokes 244 and 248 on the rotor 170 and an unequal plurality of banana slots 252 and webs or spokes 254 in the armature 174 is graphically presented. The rotor 170 and the armature 174 are positioned such that at the top of FIG. 8, a web or spoke 258 of the armature 174 is aligned with the web or spoke 244 associated with the first or outer plurality of banana slots 242 in the rotor 170. Inspection of the remainder of the rotor 170 and armature 174 reveals that at no other location around the rotor 170 and armature 174 are any other webs or spokes 244, 248 or 254 aligned. If, for example, the inner and outer pluralities of banana slots 242 and 246 were not staggered and an equal number of banana slots 242, 246 and 252 were formed in both paths of the rotor 170 and the single path of the armature 174, there would be six simultaneous locations of alignment of the webs or spokes 244, 248 and 254. Configuration of the rotor 170 and the armature 174 according to the present invention greatly reduces pulsations of the electromagnetic disc pack clutch assembly 150 and reduces low frequency noise and vibration associated with its operation.

While the foregoing description of the electromagnetic disc pack type clutch assembly 150 has been in conjunction with a transfer case assembly 16, it will be appreciated that the electromagnetic clutch assembly 150 is suitable for application in other motor vehicle driveline components, specifically, in a twin clutch rear axle such as disclosed in co-owned U.S. Pat. No. 5,884,738 granted Mar. 23, 1999 which is incorporated herein by reference for use with a front wheel drive vehicle and in a clutch mounted at an individual wheel location for selectively coupling an axle to a tire and wheel assembly.

The foregoing disclosure is the best mode devised by the inventors for practicing this invention. It is apparent, however, that apparatus incorporating modifications and variations will be obvious to one skilled in the art of electromagnetic clutches. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. An electromagnetic clutch comprising, in combination, a friction disc pack having first and second interleaved pluralities of clutch discs and an electromagnetic operator including an electromagnetic coil, a rotor, an armature and a ball ramp assembly for providing a compressive force to said disc pack when said electromagnetic coil is energized, one of said rotor and said armature defining a first plurality of slots arranged in a first circular path and a second plurality of slots arranged in a second circular path circumferentially offset from said first plurality of slots, another of said rotor and said armature having a third plurality of slots distinct in number from said first plurality of slots and arranged in a third circular path, wherein a number of arcuate slots in said first and said second pluralities of slots and a number of arcuate slots in said third plurality slots is governed by an expression $N_R \pm I_O = N_A$ where $N_R$ is the number of arcuate slots in each of said first and said second pluralities of slots, $I_O$ is an odd integer and $N_A$ is the number of slots in said third plurality of slots.

2. The electromagnetic clutch of claim 1 wherein said second circular path is radially offset from said first circular path.

3. The electromagnetic clutch of claim 1 wherein said ball ramp assembly includes a first circular member disposed for rotation with one of said pluralities of clutch discs and a second circular member disposed for rotation with said rotor.

4. The electromagnetic clutch of claim 1 wherein said second plurality of slots is equal in number to said first plurality of slots.

5. The electromagnetic clutch of claim 1 wherein said third plurality of slots is radially disposed between said first and said second pluralities of slots.

6. The electromagnetic clutch of claim 1 wherein said armature includes a face and further including recesses in said face extending between said slots.

7. The electromagnetic clutch of claim 1 wherein said armature includes a face and further including a plurality of radial channels in said face.

8. An electromagnetic motor vehicle driveline clutch comprising, in combination, an input member, an output member, a first plurality of clutch discs disposed for rotation with said input member and a second plurality of clutch discs interleaved with said first plurality of clutch discs and disposed for rotation with said output member, a clutch operator having a coil, a rotor partially surrounding said coil and defining a first plurality ($N_R$) of banana slots arranged in a first circular path and an armature defining a second plurality ($N_A$) of banana slots wherein an expression $N_R \pm I_O$ represents said second plurality $N_A$ of banana slots in said armature, $N_R$ represents said first plurality of banana slots in said rotor and $I_O$ is an odd integer.

9. The electromagnetic driveline clutch of claim 8 wherein said second circular path is radially offset from said first circular path.

10. The electromagnetic driveline clutch of claim 8 wherein said clutch operator includes a first circular member disposed for rotation with one of said pluralities of clutch discs and a second circular member disposed for rotation with said rotor.

11. The electromagnetic driveline clutch of claim 8 wherein said rotor defines a third plurality of banana slots offset from and equal in number to said first plurality of banana slots.

12. The electromagnetic driveline clutch of claim 11 wherein said second plurality of banana slots are radially disposed between said first and said third pluralities of banana slots.

13. The electromagnetic driveline clutch of claim 8 wherein said rotor defines a third plurality of banana slots circumferentially and radially offset from and equal in number to said first plurality of banana slots.

14. The electromagnetic driveline clutch of claim 8 wherein said armature includes a face and further including spokes between said second plurality of banana slots and recesses in said face at said spokes.

15. An electromagnetic driveline clutch comprising, in combination, a friction clutch pack having an input driving a first plurality of clutch discs interleaved with a second plurality of clutch discs driving an output and an electromagnetic operator having an electromagnetic coil, a rotor defining a first plurality of arcuate slots arranged in a first path and a second plurality of arcuate slots arranged in a second path and circumferentially offset from said first plurality of arcuate slots and an armature disposed adjacent said rotor and defining a third distinct plurality of arcuate slots arranged in a third path and a ball ramp assembly for providing a compressive force to said pluralities of clutch drives when said electromagnetic coil is energized, wherein a number of arcuate slots in said first and second pluralities of slots and a number of arcuate slots in said third plurality of slots is governed by an expression $N_R \pm I_O = N_A$ where $N_R$ equals the number of arcuate slots in each of said first and second pluralities of slots, $I_O$ is an odd integer and $N_A$ is the number of slots in said third plurality of slots.

16. The electromagnetic driveline clutch of claim 15 wherein said second path is radially offset from said first path.

17. The electromagnetic driveline clutch of claim 15 wherein said ball ramp assembly includes a first circular member disposed for rotation with one of said pluralities of clutch discs and a second circular member disposed for rotation with said rotor.

18. The electromagnetic driveline clutch of claim 15 wherein said armature includes a face and further including recesses in said face extending between said third plurality of slots.

19. The electromagnetic driveline clutch of claim 15 wherein said armature includes a face and further including a plurality of radial channels in said face.

20. The electromagnetic driveline clutch of claim 15 wherein said first and second paths include six arcuate slots and said third path includes five arcuate slots.

* * * * *